US012223564B2

(12) United States Patent
Xiao et al.

(10) Patent No.: US 12,223,564 B2
(45) Date of Patent: Feb. 11, 2025

(54) TWO-DIMENSIONAL FIGURE DISPLAY METHOD AND APPARATUS FOR VIRTUAL OBJECT, DEVICE, AND STORAGE MEDIUM

(71) Applicant: Tencent Technology (Shenzhen) Company Limited, Shenzhen (CN)

(72) Inventors: Jinfeng Xiao, Shenzhen (CN); Jiacheng Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 147 days.

(21) Appl. No.: 17/973,422

(22) Filed: Oct. 25, 2022

(65) Prior Publication Data

US 2023/0050933 A1    Feb. 16, 2023

Related U.S. Application Data

(63) Continuation of application No. PCT/CN2021/122698, filed on Oct. 8, 2021.

(30) Foreign Application Priority Data

Oct. 22, 2020  (CN) .......................... 202011140750.0

(51) Int. Cl.
*G06T 11/00*    (2006.01)
*A63F 13/52*    (2014.01)
(Continued)

(52) U.S. Cl.
CPC .............. *G06T 11/00* (2013.01); *A63F 13/52* (2014.09); *G06T 3/4092* (2013.01); *G06T 15/20* (2013.01);
(Continued)

(58) Field of Classification Search
CPC ....... G06T 11/00; G06T 15/20; G06T 3/4092; G06T 2200/16; G06T 2200/24; A63F 13/52; A63F 2300/66
See application file for complete search history.

(56) References Cited

U.S. PATENT DOCUMENTS

| | | | |
|---|---|---|---|
| 2016/0027200 A1* | 1/2016 | Corazza | G06T 15/04 345/420 |
| 2017/0080338 A1* | 3/2017 | Zalewski | A63F 13/213 |
| 2019/0228581 A1* | 7/2019 | Dascola | G06F 3/048 |

FOREIGN PATENT DOCUMENTS

| | | |
|---|---|---|
| CN | 103366400 A | 10/2013 |
| CN | 108305312 A | 7/2018 |

(Continued)

OTHER PUBLICATIONS

E-sports Event Esport, "LOL Humanized Changes are Coming Soon: the In-Game Avatar Will Change with the Skin!", Baidu, Jul. 25, 2017, 2 pgs., Retrieved from the Internet: https://baijiahao.baidu.com/s?id=1573854483925053&wfr=spider&for=pc&searchword=%E6%B8%B8%E6%88%8F%E4%N8%AD%E7%8E%A9%E5%AE%B6%E7%9A%84%E5%%A4%B4%E5%83%EF%E5%AE%9E%E6%97%B6%E5%Ef%98%E5%EC%96.

(Continued)

Primary Examiner — Michelle Chin
(74) Attorney, Agent, or Firm — Morgan, Lewis & Bockius LLP

(57) ABSTRACT

This application discloses a for displaying a two-dimensional figure of a virtual object performed by a computer device. The method includes: rendering a two-dimensional image of a virtual object based on a corresponding three-dimensional figure model according to a plurality of preset parameters; displaying a target interface comprising the two-dimensional image of the virtual object; and displaying an updated two-dimensional image of the virtual object (Continued)

when an update condition is met, wherein the updated two-dimensional image corresponds to the three-dimensional figure model of the virtual object.

20 Claims, 6 Drawing Sheets

(51) Int. Cl.
   *G06T 3/40* (2024.01)
   *G06T 3/4092* (2024.01)
   *G06T 15/20* (2011.01)
(52) U.S. Cl.
   CPC ....... *A63F 2300/66* (2013.01); *G06T 2200/16* (2013.01); *G06T 2200/24* (2013.01)

(56) References Cited

FOREIGN PATENT DOCUMENTS

| | | |
|---|---|---|
| CN | 109345616 A | 2/2019 |
| CN | 110428484 A | 11/2019 |
| CN | 111462307 A | 7/2020 |
| CN | 111589139 A | 8/2020 |
| CN | 112156464 A | 1/2021 |
| CN | 112156464 B | 3/2023 |
| KR | 20080011986 | 2/2008 |
| KR | 20110021330 A | 3/2011 |

OTHER PUBLICATIONS

Gu Xing Ji Wan Jia, "How to Change the Avatar Frame in Fantasy Westward Journey 3D Version", Baidu, Jul. 22, 2020, 3 pgs., Retrieved from the Internet: https://jingyan.baidu.com/article/95c9d20d98f274ad4175615d.html.

Tencent Technology, ISR, PCT/CN2021/122698, Jan. 6, 2022, 3 pgs.

Tencent Technology, WO, PCT/CN2021/122698, Jan. 6, 2022, 5 pgs.

Tencent Technology, IPRP, PCT/CN2021/122698, Apr. 13, 2023, 6 pgs.

Tencent Technology, Vietnamese Office Action, VN Patent Application No. 1202205354, Jun. 25, 2024, 4 pgs.

Tencent Technology, Korean Office Action, KR Patent Application No. 10-2022-7040625, Aug. 6, 2024, 10 pgs.

YouTube.com, "Tips for GTA5" Dance with your Character, Emote !! (Featuring: Facial Expression, Walking Style), Mar. 2019, Retrieved from the Internet: https://www.youtube.com/watch=wkQ9Lutbngw.

* cited by examiner

TWO-DIMENSIONAL FIGURE DISPLAY METHOD AND APPARATUS FOR VIRTUAL OBJECT, DEVICE, AND STORAGE MEDIUM

CROSS-REFERENCE TO RELATED APPLICATIONS

This application is a continuation application of PCT Patent Application No. PCT/CN2021/122698, entitled "TWO-DIMENSIONAL IMAGE DISPLAY ME MOD AND APPARATUS FOR VIRTUAL OBJECT, AND DEVICE AND STORAGE MEDIUM" filed on Oct. 8, 2021, which claims priority to Chinese Patent Application No. 202011140750.0, filed with the State Intellectual Property Office of the People's Republic of China on Oct. 22, 2020, and entitled "TWO-DIMENSIONAL FIGURE DISPLAY METHOD AND APPARATUS FOR VIRTUAL OBJECT, DEVICE, AND STORAGE MEDIUM", all of which are incorporated herein by reference in their entirety.

FIELD OF THE TECHNOLOGY

Embodiments of this application relate to the field of virtual scenes, and in particular, to a two-dimensional figure display method and apparatus for a virtual object, a device, and a storage medium.

BACKGROUND OF THE DISCLOSURE

In a virtual scene-based game application, a two-dimensional figure of a virtual object controlled by a user generally needs to be displayed.

In the related art, to improve a display effect of the two-dimensional figure of the virtual object, a two-dimensional profile image of the virtual object may be obtained by photographing a three-dimensional figure of the virtual object. For example, setting a two-dimensional avatar corresponding to the virtual object is used as an example. The user opens a three-dimensional figure display interface of a game role in an application program, an image of a region (for example, a head region) in the three-dimensional figure display interface is captured as an avatar of the game role after the user clicks a control of "set as an avatar" in the three-dimensional figure display interface, and the two-dimensional image is displayed at a position where the avatar needs to be displayed later.

However, in the foregoing solution, the user needs to manually trigger to set the two-dimensional profile image of the virtual object. As a result, the two-dimensional profile image set by the user does not match the three-dimensional figure of the virtual object in many cases, leading to a poor display effect of the two-dimensional figure of the virtual object.

SUMMARY

Embodiments of this application provide a two-dimensional figure display method and apparatus for a virtual object, a device, and a storage medium, which can improve a display effect of a two-dimensional figure of the virtual object. The technical solutions are as follows:

According to an aspect, a method for displaying a two-dimensional figure of a virtual object displayed in a virtual scene is performed by a computer device, the method including:

rendering a two-dimensional image of a virtual object based on a corresponding three-dimensional figure model according to a plurality of preset parameters;

displaying a target interface comprising the two-dimensional image of the virtual object; and displaying an updated two-dimensional image of the virtual object when an update condition is met, wherein the updated two-dimensional image corresponds to the three-dimensional figure model of the virtual object.

According to an aspect, a method for displaying a two-dimensional figure of a virtual object displayed in a virtual scene is performed by a computer device, the method including:

loading a three-dimensional figure model of the virtual object when a two-dimensional profile updating condition is met, where the virtual object has a three-dimensional figure model of an object displayed in the virtual scene;

performing two-dimensional rendering on the three-dimensional figure model to obtain a two-dimensional profile image of the virtual object; and displaying, when a target interface including a two-dimensional figure display position of the virtual object is displayed, the two-dimensional profile image at the two-dimensional figure display position.

According to an aspect, a method for displaying a two-dimensional figure of a virtual object displayed in a virtual scene is provided, performed by a computer device, the method including:

displaying an application interface of an application program corresponding to the virtual scene, wherein the application interface includes a two-dimensional figure display position;

displaying a two-dimensional profile image of the virtual object at the two-dimensional figure display position, wherein the virtual object is an object displayed in the virtual scene;

changing a profile image of the virtual object when an operation for changing a profile image of the virtual object is received; and displaying an updated two-dimensional profile image of the virtual object at the two-dimensional figure display position, wherein the updated two-dimensional profile image corresponds to a changed figure of the virtual object.

According to another aspect, a two-dimensional figure display apparatus for a virtual object is provided, including:

an interface display module, configured to render a two-dimensional image of a virtual object based on a corresponding three-dimensional figure model according to a plurality of preset parameters;

an image display module, configured to display a target interface comprising the two-dimensional image of the virtual object; and the image display module being further configured to display an updated two-dimensional image of the virtual object when an update condition is met, wherein the updated two-dimensional image corresponds to the three-dimensional figure model of the virtual object.

In some embodiments, the image display module includes:

a model loading sub-module, configured to load the three-dimensional figure model of the virtual object when the two-dimensional profile updating condition is met;

a rendering sub-module, configured to perform two-dimensional rendering on the three-dimensional figure model to obtain the updated two-dimensional profile image of the virtual object; and an image display sub-module, configured to display the updated two-dimensional profile image at the two-dimensional figure display position.

In some embodiments, the model loading sub-module is configured to:

obtain an attitude parameter of the three-dimensional figure model based on the two-dimensional figure display position, where the attitude parameter includes at least one of an action and an expression; and load the three-dimensional figure model based on the attitude parameter.

In some embodiments, the apparatus further includes:

a first interface display module, configured to display an attitude parameter setting interface before the model loading sub-module loads the three-dimensional figure model of the virtual object;

an attitude parameter obtaining module, configured to obtain an attitude parameter set corresponding to the two-dimensional figure display position in the attitude parameter setting interface; and an attitude parameter saving module, configured to save the attitude parameter set corresponding to the two-dimensional figure display position.

In some embodiments, the model loading sub-module includes:

a loading parameter obtaining unit, configured to obtain a loading parameter of the three-dimensional figure model, where the loading parameter includes at least one of a resolution and a size; and a loading unit, configured to load the three-dimensional figure model based on the loading parameter.

In some embodiments, the apparatus is applicable to a terminal, and the loading parameter obtaining unit is configured to obtain the loading parameter based on a computing capability parameter of the terminal.

In some embodiments, the target interface is an application interface of an application program corresponding to the virtual object, and the model loading sub-module is configured to pre-load the three-dimensional figure model before the application interface is displayed.

In some embodiments, the model loading sub-module is configured to:

load the three-dimensional figure model when a previous interface of the application interface is displayed; or load the three-dimensional figure model when a load waiting interface is displayed, where the load waiting interface is an interface displayed before the application interface is completely loaded.

In some embodiments, the apparatus further includes:

a first information obtaining module, configured to obtaining figure information of the virtual object from the two-dimensional profile image before updating, where the figure information is used for describing figure features of a three-dimensional model of the virtual object corresponding to the two-dimensional profile image;

a second information obtaining module, configured to obtain current figure information of the virtual object; and a condition determining module, configured to determine that the two-dimensional profile updating condition is met when the figure information of the virtual object from the two-dimensional profile image before updating does not match the current figure information of the virtual object.

In some embodiments, the second information obtaining module is configured to obtain the current figure information of the virtual object from a server, where the current figure information of the virtual object is uploaded to the server when the virtual object is created or a figure change occurs.

In some embodiments, the rendering sub-module is configured to:

obtain a rendering parameter of the three-dimensional figure model based on the two-dimensional figure display position, where the rendering parameter includes at least one of a lens position and a rendering resolution of a virtual camera in the virtual scene; and perform two-dimensional rendering on the three-dimensional figure model based on the rendering parameter to obtain the updated two-dimensional profile image.

In some embodiments, the apparatus further includes:

a second interface display module, configured to display a rendering parameter setting interface before the model loading sub-module loads the three-dimensional figure model of the virtual object;

a rendering parameter obtaining module, configured to obtain a rendering parameter set corresponding to the two-dimensional figure display position in the rendering parameter setting interface; and a rendering parameter saving module, configured to save the rendering parameter set corresponding to the two-dimensional figure display position.

In some embodiments, the apparatus includes:

a condition determining module, configured to determine, before the model loading sub-module loads the three-dimensional figure model of the virtual object, that the two-dimensional profile updating condition is met when an operation for changing a profile image of the virtual object is received.

According to another aspect, a computer device is provided, including a processor and a memory, the memory storing at least one computer instruction, the at least one computer instruction being loaded and executed by the processor and cause the computer device to implement the two-dimensional figure display method for a virtual object described above.

According to another aspect, a computer-readable storage medium is provided, storing at least one computer instruction, the at least one computer instruction being loaded and executed by a processor of a computer device and causing the computer device to implement the two-dimensional figure display method for a virtual object described above.

According to another aspect, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the two-dimensional figure display method for a virtual object described above.

The technical solutions provided in the embodiments of this application achieve at least the following beneficial effects:

when detecting that a two-dimensional profile updating condition is met, a two-dimensional profile image is automatically generated according to a three-dimensional figure model of a virtual object, so that the latest two-dimensional profile image can be displayed in an interface immediately. Therefore, a two-dimensional figure displayed in an interface corresponding to a virtual scene can always match a three-dimensional figure of the virtual object, thereby improving a display effect of a two-dimensional figure of the virtual object.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
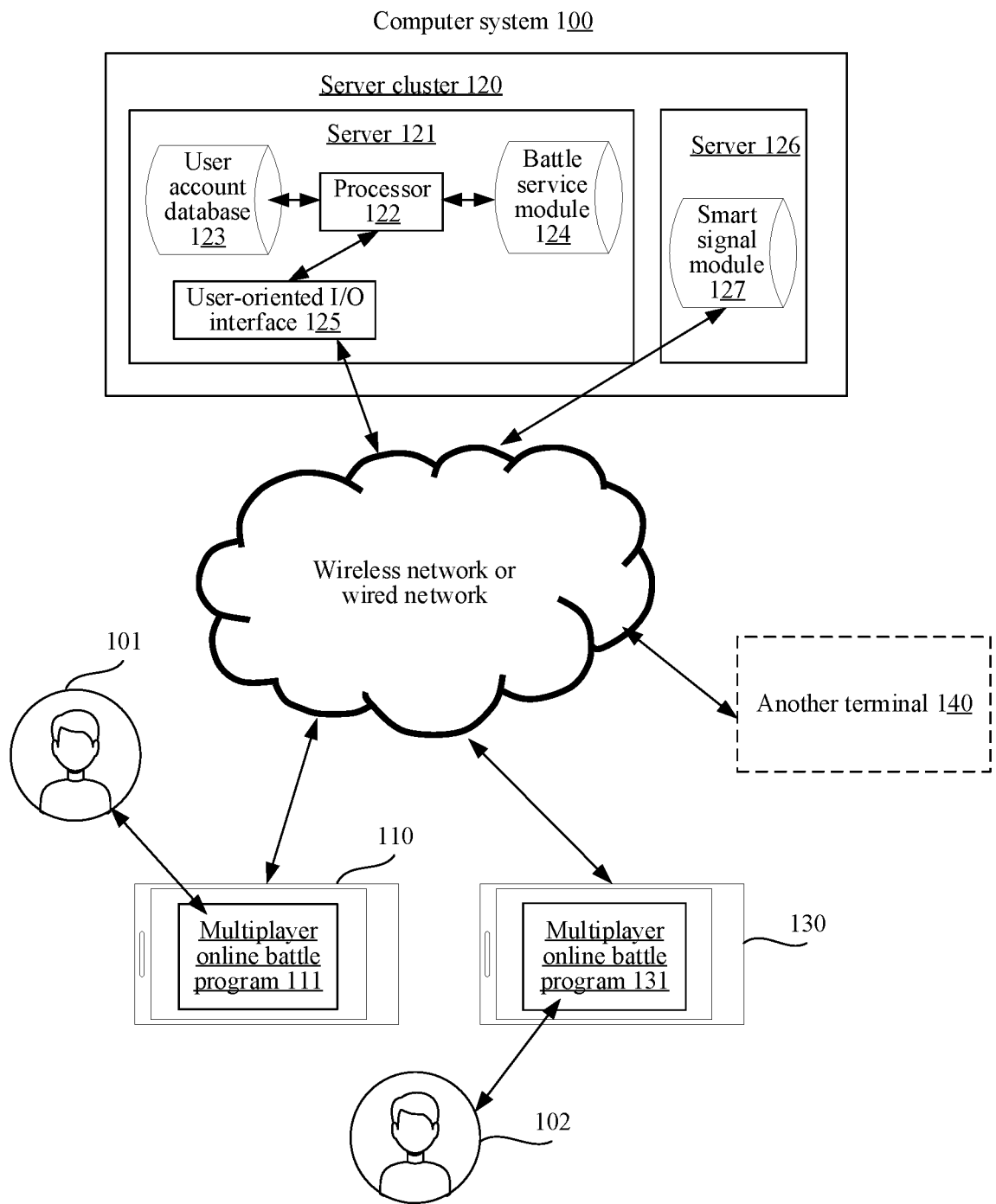
FIG. 1 is a structural block diagram of a computer system according to an exemplary embodiment of this application.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of devices and methods that are described in detail in the appended claims and that are consistent with some aspects of this application.

It is to be understood that "several" mentioned in this specification means one or more and "a plurality of" means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

For ease of understanding, several terms involved in this application are explained below.
1) Virtual Scene A virtual scene is a virtual scene displayed (or provided) when an application program is run on a terminal. The virtual scene may be a simulated environment scene of a real world, or may be a semi-simulated semi-fictional three-dimensional environment scene, or may be an entirely fictional three-dimensional environment scene. The virtual scene may be any one of a two-dimensional virtual scene, a 2.5-dimensional virtual scene, or a three-dimensional virtual scene, and a description is made by using an example in which the virtual scene is a three-dimensional virtual scene in the following embodiments, but this is not limited. In some embodiments, the virtual scene is further used for a virtual scene battle between at least two virtual roles. In some embodiments, there are virtual resources available to the at least two virtual roles in the virtual scene. In some embodiments, the virtual scene includes a virtual world which is provided with a square map. The square map includes a lower left corner region and an upper right corner region that are symmetrical. Virtual roles on two opposing camps occupy the regions respectively, and the objective of each camp is to destroy a target building/stronghold/base/nexus deep in the opponent's region to win victory.
2) Virtual Object A virtual object is a movable object in a virtual scene. The movable object may be at least one of a virtual person, a virtual animal, or a cartoon person. In some embodiments, when the virtual scene is a three-dimensional virtual scene, the virtual object may be a three-dimensional model. Each virtual object has a shape and a volume in the three-dimensional virtual scene, and occupies some space in the three-dimensional virtual scene. In some embodiments, a virtual role is a three-dimensional role constructed based on three-dimensional human skeleton technology. The virtual role wears different skins to implement different appearances. In some embodiments, the virtual role may also be implemented through a 2.5-dimensional model or a 2-dimensional model. This is not limited in the embodiments of this application.

The method provided in this application may be applicable to a sandbox game, a virtual reality (VR) application program, a three-dimensional map program, a military simulation program, a first-person shooting game (FPS), a multiplayer online battle arena game (MOBA), and a role-playing game. The following embodiments are described based on an application in a game as an example.

A virtual scene-based game is formed by maps of one or more game worlds. The virtual scene in the game simulates scenes in the real world. A user may control a master virtual object in the game to perform actions such as walking, running, jumping, shooting, combat, driving, casting an ability, attacked by another virtual object, damaged by the virtual scene, and attacking another virtual object in the virtual scene, which has relatively high interactivity. In addition, a plurality of users may form a team online to perform an arena game.

FIG. 1 is a structural block diagram of a computer system according to an exemplary embodiment of this application. The computer system 100 includes: a first terminal 110, a server cluster 120, and a second terminal 130.

A client 111 supporting a virtual scene is installed and run on the first terminal 110, and the client 111 may be a multiplayer online battle program. When the first terminal runs the client 111, a user interface (UI) of the client 111 is displayed on a screen of the first terminal 110. The client may be any one of a military simulation program, a MOBA game, an escape shooting game, and a simulation game (SLG), a sandbox game, or a role-playing game. In this embodiment, an example in which the client is a MOBA game is used for description. The first terminal 110 is a terminal used by a first user 101. The first user 101 uses the first terminal 110 to control a first virtual object located in the virtual scene to perform activities, and the first virtual object may be referred to as a master virtual object of the first user 101. The activities of the first virtual object include, but are not limited to: at least one of adjusting body postures, crawling, walking, running, riding, flying, jumping, driving, picking, shooting, attacking, or throwing. For example, the first virtual object is a first virtual person, such as a simulated person role or a cartoon person role.

A client 131 supporting the virtual scene is installed and run on the second terminal 130, and the client 131 may be a multiplayer online battle program. When the second terminal 130 runs the client 131, a UI of the client 131 is displayed on a screen of the second terminal 130. The client may be any one of a military simulation program, a MOBA game, an escape shooting game, or an SLG. In this embodiment, an example in which a client is a MOBA game is used for description. The second terminal 130 is a terminal used by a second user 102. The second user 102 uses the second terminal 130 to control a second virtual object located in the virtual scene to perform activities, and the second virtual object may be referred to as a master virtual object of the second user 102. For example, the second virtual object is a second virtual person, such as a simulated person role or a cartoon person role.

In some embodiments, the first virtual person and the second virtual person are located in the same virtual scene. In some embodiments, the first virtual person and the second virtual person may belong to the same camp, the same team, or the same organization, have a friend relationship, or have a temporary communication permission. In some embodiments, the first virtual person and the second virtual person may belong to different camps, different teams, or different organizations, or may be enemies of each other.

In some embodiments, the client installed on the first terminal 110 is the same as the client installed on the second terminal 130, or the clients installed on the two terminals are the same type of clients on different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types, and the device type includes at least one of a smartphone, a tablet computer, an e-book reader, an MP3 player, an MP4 player, a laptop, or a desktop computer.

FIG. 1 shows only two terminals. However, a plurality of other terminals 140 may access the server cluster 120 in different embodiments. In some embodiments, one or more terminals 140 are terminals corresponding to a developer. A developing and editing platform for the client having a virtual scene is installed on the terminal 140. The developer may edit and update the client on the terminal 140 and transmit an updated client installation package to the server cluster 120 through a wired or wireless network. The first terminal 110 and the second terminal 130 may download the client installation package from the server cluster 120 to update the client.

The first terminal 110, the second terminal 130, and the another terminal 140 are connected to the server cluster 120 through a wireless network or a wired network.

The server cluster 120 includes at least one of one server, a plurality of servers, a cloud computing platform, or a virtualization center. The server cluster 120 is configured to provide a backend service for a client supporting a three-dimensional virtual scene. In some embodiments, the server cluster 120 is responsible for primary computing work, and the terminal is responsible for secondary computing work; or the server cluster 120 is responsible for secondary computing work, and the terminal is responsible for primary computing work; or a distributed computing architecture is adopted between the cloud server cluster 120 and the terminal to perform collaborative computing.

In a schematic example, the server cluster 120 includes a server 121 and a server 126. The server 121 includes a processor 122, a user account database 123, a battle service module 124, and a user-oriented input/output (I/O) interface 125. The processor 122 is configured to load instructions stored in the server 121, and process data in the user account database 121 and the battle service module 124. The user account database 121 is configured to store data of user accounts used by the first terminal 110, the second terminal 130, and the another terminal 140, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish a communication between the first terminal 110 and/or the second terminal 130 through a wireless network or a wired network for data exchange. In some embodiments, a smart signal module 127 is arranged in the server 126, and the smart signal module 127 is configured to implement some or all functional steps of a two-dimensional figure display method for a virtual object provided in the following embodiments.

With reference to the introduction of the nouns and the description of the implementation environment, this application provides a solution of automatically updating a two-dimensional profile image of a virtual object based on a three-dimensional virtual figure of the virtual object. A computer device may display a target interface including a two-dimensional figure display position of the virtual object, where the virtual object has a three-dimensional figure model of an object displayed in the virtual scene; display a two-dimensional profile image of the virtual object at the two-dimensional figure display position; and display an updated two-dimensional profile image of the virtual object at the two-dimensional figure display position when a two-dimensional profile updating condition is met, where the updated two-dimensional profile image corresponds to a three-dimensional figure model of the virtual object. In some embodiments, the two-dimensional profile image is updated when the previously stored two-dimensional image does not match the three-dimensional figure model of the virtual object. In some other embodiments, the two-dimensional profile image is updated after an operation for changing a profile image of the virtual object is received.

Figure 2:
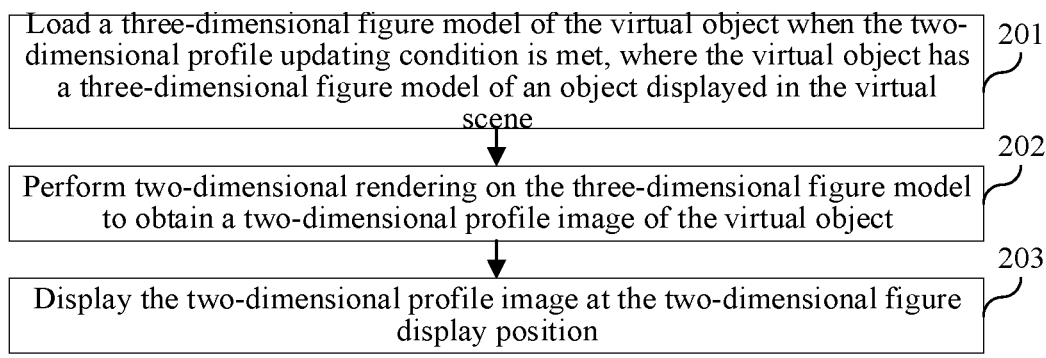
FIG. 2 is a flowchart of a two-dimensional figure display method for a virtual object according to an exemplary embodiment of this application.

FIG. 2 is a flowchart of a two-dimensional figure display method for a virtual object according to an exemplary embodiment of this application. The method may be performed by a computer device on which an application program corresponding to the virtual scene is run. For example, the computer device may be a terminal (for example, any terminal in FIG. 1). As shown in FIG. 2, a process of displaying an updated two-dimensional profile image of the virtual object at the two-dimensional figure display position when a two-dimensional profile updating condition is met may include the following steps:

Step 201: Load a three-dimensional figure model of the virtual object when the two-dimensional profile updating condition is met, where the virtual object has a three-dimensional figure model of an object displayed in the virtual scene.

In the embodiments of this application, the two-dimensional profile updating condition is a condition for the computer device to performs detection in a manner other than detecting a user operation.

In some embodiments, the computer device determines whether the two-dimensional profile updating condition is met by detecting a running state of the application program corresponding to the virtual scene.

In some embodiments, the computer device determines whether the two-dimensional profile updating condition is met by detecting a profile updating state of the virtual object.

In some embodiments, the computer device determines whether the two-dimensional profile updating condition is met by detecting the running state of the application program and the profile updating state of the virtual object.

Step 202: Perform two-dimensional rendering on the three-dimensional figure model to obtain a two-dimensional profile image of the virtual object. In some embodiments, the two-dimensional image of a virtual object is rendered based on the corresponding three-dimensional figure model according to a plurality of preset parameters such as a rendering perspective anchored at the three-dimensional figure model or a pose of the three-dimensional figure model, which may be selected by a user. In some embodiments, the two-dimensional image of a virtual object is rendered by loading the three-dimensional figure model based on at least a portion of the plurality of preset parameters and rendering the two-dimensional image based on the three-dimensional figure model according to at least a portion of the plurality of preset parameters. In some embodiments, the loading of the three-dimensional figure model is performed with a resolution determined based on a computing capability parameter of the computer device and happens at a loading stage before the application interface is completely loaded.

In some embodiments, the computer device performs image acquisition on the three-dimensional figure model through a virtual camera to obtain the two-dimensional profile image.

In the embodiments of this application, when the two-dimensional profile image of the virtual object already exists, the computer device may perform two-dimensional rendering on the three-dimensional figure model to obtain the updated two-dimensional profile image of the virtual object when the two-dimensional profile updating condition is met.

Step 203: Display the two-dimensional profile image at the two-dimensional figure display position.

The computer device displays, when a target interface including a two-dimensional figure display position of the virtual object is displayed, the two-dimensional profile image at the two-dimensional figure display position.

In some embodiments, the computer device may determine that the two-dimensional profile updating condition is met when an operation for changing a profile image of the virtual object is received.

In the embodiments of this application, the computer device automatically detects the two-dimensional profile updating condition and performs two-dimensional rendering on the three-dimensional figure model, so that the two-dimensional profile image of the virtual object can be updated immediately. Therefore, when a target interface including a two-dimensional figure display position corresponding to the two-dimensional profile image is displayed, the latest two-dimensional profile image may be displayed.

According to the solution shown in the embodiments of this application, the computer device may perform, in a case without a user actively setting the two-dimensional profile image, the following operations to automatically update the two-dimensional profile image of the virtual object:

S1: Display an application interface of an application program corresponding to a virtual scene, where the application interface includes a two-dimensional figure display position.

S2: Display a two-dimensional profile image of the virtual object at the two-dimensional figure display position, where the virtual object is an object displayed in the virtual scene.

S3: Change a figure of the virtual object when an operation for changing a profile image of the virtual object is received; and determine whether a two-dimensional profile updating condition is met.

S4: Display an updated two-dimensional profile image of the virtual object at the two-dimensional figure display position, where the updated two-dimensional profile image corresponds to a changed figure of the virtual object.

Based on the above, according to the solution shown in the embodiments of this application, when detecting that a two-dimensional profile updating condition is met, a two-dimensional profile image is automatically generated according to a three-dimensional figure model of a virtual object, so that the latest two-dimensional profile image can be displayed in an interface immediately. Therefore, a two-dimensional figure displayed in an interface corresponding to a virtual scene can always match a three-dimensional figure of the virtual object, thereby improving a display effect of a two-dimensional figure of the virtual object.

Figure 3:
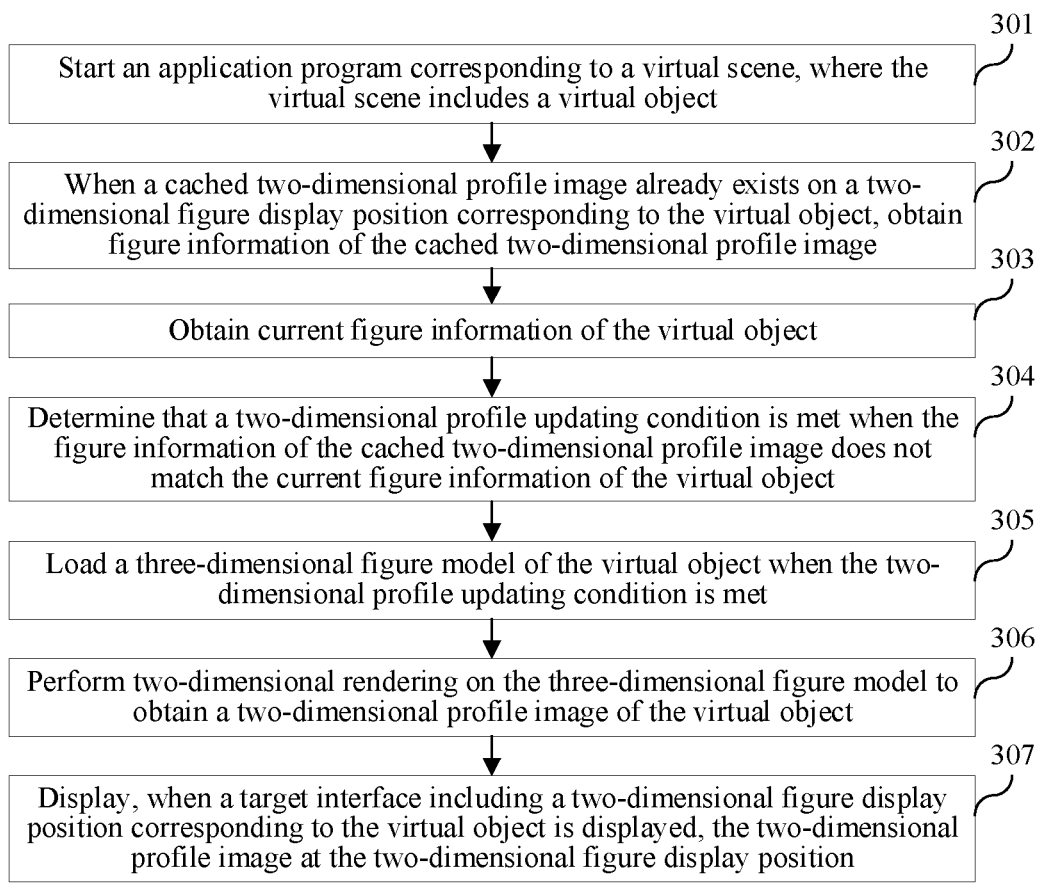
FIG. 3 is a flowchart of a two-dimensional figure display method for a virtual object according to an exemplary embodiment of this application.

The computer device detecting whether the two-dimensional profile updating condition is met through current figure information of the virtual object is used as an example. FIG. 3 is a flowchart of a two-dimensional figure display method for a virtual object according to an exemplary embodiment of this application. The method may be performed by a computer device on which an application program corresponding to the virtual scene is run. For example, the computer device may be a terminal (for example, any terminal in FIG. 1). As shown in FIG. 3, the method may include the following steps:

Step 301: Start an application program corresponding to a virtual scene, where the virtual scene includes a virtual object.

In the embodiments of this application, an application program corresponding to the virtual scene is installed in the terminal. After the terminal starts the application program, the user may log in to an application account in the application program, and create and control one or more virtual objects corresponding to the application account.

Step 302: When a cached two-dimensional profile image already exists on a two-dimensional figure display position corresponding to the virtual object, obtain figure information of the cached two-dimensional profile image.

The cached two-dimensional profile image is a two-dimensional profile image of the virtual object before updating. Before the two-dimensional profile image is updated, the computer device may first obtain figure information of the virtual object from the two-dimensional profile image before updating.

In some embodiments, the two-dimensional figure display position is an application interface in the application program of the virtual scene.

In some embodiments, the two-dimensional figure display position is an interface outside the application program corresponding to the virtual scene, for example, is an account information page corresponding to the virtual object in a website of the application program corresponding to the virtual scene, and the user may view information such as a two-dimensional figure of each virtual object in the account information page.

The figure information is used for describing figure features of a three-dimensional model.

In some embodiments, the figure information includes appearance feature information of each part in a three-dimensional model of the virtual object. The appearance feature information may include at least one or body appearance or decorative appearance. For example, the body appearance includes a hair style, a hair color, a face shape, an eye shape, and a pupil color, and the decorative appearance includes a fashion dress and a decorative widget.

In some embodiments, the appearance of the virtual object is automatically generated by a system (for example, random appearance is generated) or customized by the user. For example, appearance of each part (for example, the head or the limbs) in the virtual object may be customized by the user while creating the virtual object. Alternatively, after the virtual object is created, the user may reset the appearance through a figure changing interface.

In some embodiments, the decorative appearance of the virtual object is changed by the user controlling the virtual object to equip a corresponding fashion dress or widget. For example, the user may control the virtual object to equip a corresponding fashion dress or widget in the figure changing interface.

In the embodiments of this application, a two-dimensional profile image of the virtual object that has been generated before may be stored in the computer device, and the computer device further records figure information of the virtual object corresponding to the two-dimensional profile image when generates the two-dimensional profile image of the virtual object. The generated and stored two-dimensional profile image is referred to as a cached two-dimensional profile image.

After the application program is started, the user account is logged in, and the user is detected to select a virtual object to enter the virtual scene, the computer device may detect whether a cached two-dimensional profile image of the virtual object corresponding to each two-dimensional figure display position exists locally, and obtains figure information of the cached two-dimensional profile image when determining that the cached two-dimensional profile image of the virtual object corresponding to each two-dimensional figure display position exists.

Step 303: Obtain current figure information of the virtual object.

In some embodiments, the computer device obtains the current figure information of the virtual object from a server, where the current figure information of the virtual object is uploaded to the server when the virtual object is created or a figure change occurs.

In the embodiments of this application, in a process that the user creates a virtual object or the user controls a virtual object, if a figure of the virtual object changes (for example, the user changes a body figure of the virtual object through a figure customization interface of the virtual object, or the user controls the virtual object to equip a new fashion dress or decorative widget), the application program in the computer device generates/changes the figure of the virtual object, and uploads the current figure information of the virtual object to the server.

Step 304: Determine that a two-dimensional profile updating condition is met when the figure information of the cached two-dimensional profile image does not match the current figure information of the virtual object.

That is, it is determined that the two-dimensional profile updating condition is met when the figure information of the virtual object from the two-dimensional profile image before updating does not match the current figure information of the virtual object.

In the embodiments of this application, the computer device matches the figure information of the cached two-dimensional profile image with the current figure information of the virtual object one by one, determines that the figure information does not match the current figure information when any item differs, and determines that the two-dimensional profile updating condition is met.

In some embodiments, when all items of the figure information of the cached two-dimensional profile image and the current figure information of the virtual object are the same, the computer device determines that the figure information matches the current figure information, and determines that the two-dimensional profile updating condition is not met.

In the embodiments of this application, in a process that the user controls the virtual object in the computer device, when the figure of the virtual object changes and the cached two-dimensional profile image in the computer device is not updated, the computer device may detect whether the two-dimensional profile updating condition is met to trigger a subsequent two-dimensional profile image generation process.

In another possible implementation, when the computer device detects that the cached two-dimensional profile image of the virtual object corresponding to each two-dimensional figure display position does not exist locally, the computer device determines that the two-dimensional profile updating condition is met.

In the embodiments of this application, after the user creates a new virtual object in the computer device or opens the application program in another new computer device and logs in to a user account of a created virtual object, the two-dimensional profile image of the virtual object corresponding to each two-dimensional figure display position may not exist in the computer device, and in this case, the computer device determines that the two-dimensional profile updating condition is met.

In another possible implementation, the computer device may determine that the two-dimensional profile updating condition is met when an operation for changing a profile image of the virtual object is received.

Step 305: Load a three-dimensional figure model of the virtual object when the two-dimensional profile updating condition is met.

In the embodiments of this application, after the computer device detects that the two-dimensional profile updating condition is met, the computer device may load a three-dimensional figure model of the virtual object, to subsequently generate a latest two-dimensional profile image according to the three-dimensional figure model.

In some embodiments, the loading a three-dimensional figure model of the virtual object includes:

obtaining an attitude parameter of the three-dimensional figure model based on the two-dimensional figure display position, where the attitude parameter includes at least one of an action and an expression; and loading the three-dimensional figure model based on the attitude parameter.

In the embodiments of this application, for different two-dimensional figure display positions, attitudes of corresponding two-dimensional figures may also be different. In some embodiments, the same two-dimensional figure display position may include one or more attitude parameters. For example, when the virtual object performs different actions, the attitude parameters of the same two-dimensional figure display position may be different.

For example, an avatar display position on an upper left corner and a two-dimensional figure display position on a lower right corner in a game interface are used as an example. An action and an expression corresponding to the avatar display position are a standing action and a smile expression; when the virtual object runs, an action and an expression at the two-dimensional figure display position is a running action and a breath expression; and when the virtual object casts an ability, the action and the expression corresponding to the two-dimensional figure display position are an ability casting action (for example, an action of throwing out an item) and a serious expression.

In the embodiments of this application, the computer device may store corresponding attitude parameters respectively corresponding to different two-dimensional figure display positions, query an attitude parameter according to a two-dimensional figure display position when the three-dimensional figure model is loaded, and load the three-dimensional figure model according to the queried attitude parameter and the current figure information of the virtual object.

In some embodiments, before the loading a three-dimensional figure model of the virtual object, the method further includes:

displaying an attitude parameter setting interface; obtaining an attitude parameter set corresponding to the two-dimensional figure display position in the attitude parameter setting interface; and saving the attitude parameter set corresponding to the two-dimensional figure display position.

In the embodiments of this application, an attitude parameter customization function may be provided. That is, the user may set an action and an attitude of a two-dimensional figure displayed on each two-dimensional figure display position through the attitude parameter setting interface. After the user sets the attitude parameter of the two-dimensional figure displayed on each two-dimensional figure display position through the attitude parameter setting interface, the computer device may store the attitude parameter set by the user and each two-dimensional figure display position correspondingly for subsequent query and use.

Figure 4:
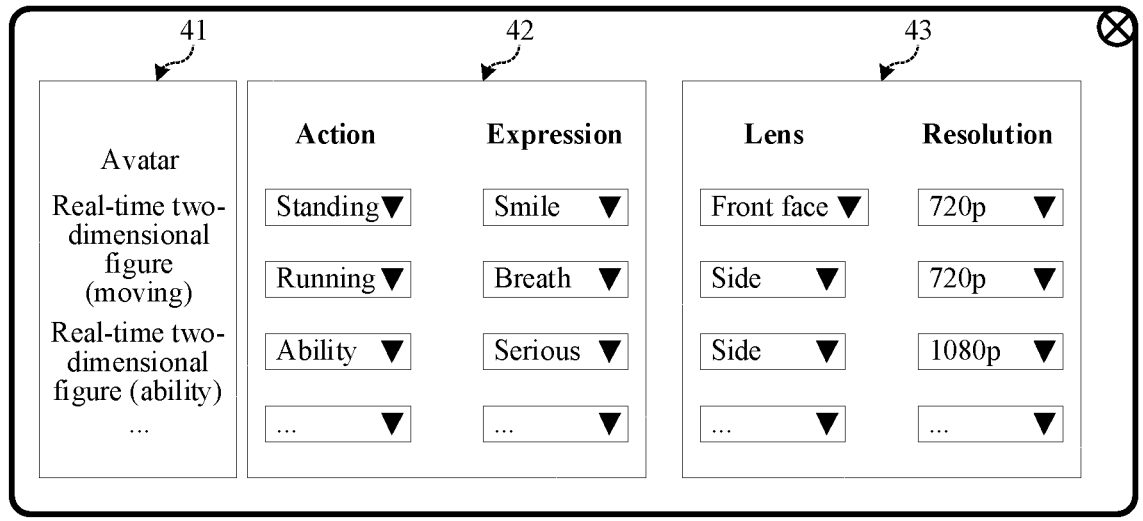
FIG. 4 is a schematic interface diagram of a parameter setting interface involved in the embodiment shown in FIG. 3.

For example, FIG. 4 is a schematic interface diagram of a parameter setting interface according to an embodiment of this application. As shown in FIG. 4, the parameter setting interface includes two-dimensional figure display positions 41 and attitude parameter setting controls 42 respectively corresponding to the two-dimensional figure display positions 41. The attitude parameter setting controls 42 include controls used for setting actions and controls used for setting expressions. In the solution shown in FIG. 4, the attitude parameter setting controls 42 are embodied as a drop-down list, and the user may trigger an action/expression list through the drop-down list, to set an action/expression corresponding to a current position.

In some embodiments, the loading a three-dimensional figure model of the virtual object includes:

obtaining a loading parameter of the three-dimensional figure model, where the loading parameter includes at least one of a resolution and a size; and loading the three-dimensional figure model based on the loading parameter.

The resolution and the size may affect definition of a two-dimensional profile image subsequently generated according to the three-dimensional figure model. For example, a higher resolution of the three-dimensional figure model indicates higher definition of the two-dimensional profile image subsequently generated according to the three-dimensional figure model, and a smaller size of the three-dimensional figure model indicates lower definition of the two-dimensional profile image subsequently generated according to the three-dimensional figure model and adjusted to a corresponding size set at a two-dimensional figure display position.

In some embodiments, when the solution shown in the embodiments of this application is performed by a terminal, the obtaining a loading parameter of the three-dimensional figure model includes:

obtaining the loading parameter based on a computing capability parameter of the terminal.

In some embodiments, the computing capability parameter includes a number of cores of a processor (for example, a central processing unit/graphic processing unit), a core frequency, a screen resolution, and a size of an internal memory.

The solution shown in this application pre-process the loaded three-dimensional figure model to adapt to rendering capabilities of different models. For example, in a low-end model, a low-precision model whose precision and size are relatively small is selected and loaded according to a reading and writing capability and a rendering capability of the model; and in a model having relatively good performance, a high-precision model is normally loaded.

In some embodiments, when the target interface including the two-dimensional figure display position is an application interface of the application program corresponding to the virtual object, the loading a three-dimensional figure model of the virtual object includes:

pre-loading the three-dimensional figure model before the application interface is displayed.

In some embodiments, the pre-loading the three-dimensional figure model before the application interface is displayed includes:

loading the three-dimensional figure model when a previous interface of the application interface is displayed; or loading the three-dimensional figure model when a load waiting interface is displayed, where the load waiting interface is an interface displayed before the application interface is completely loaded.

In some embodiments, the previous interface is an interface triggering to enter the application interface. For example, the previous interface may be an interface in which an interface entrance of the application interface is located. For example, when the computer device displays an interface A, the interface A includes an entrance triggering display of an interface B, and the interface B includes the two-dimensional figure display position, the interface A may be referred to as a previous interface of the interface B.

Alternatively, the previous interface may be an interface of a virtual scene triggering to enter the application interface. For example, when the computer device displays an interface of a virtual scene of a map A, the virtual scene includes a specified virtual object or prop entering a virtual scene B of a map B, and the user controls the virtual object to interact with the specified virtual object or prop to enter an interface corresponding to the virtual scene B. In this case, the interface of the virtual scene B is the application interface, and the interface of the virtual scene A is the previous interface of the application interface.

In some embodiments, the previous interface is an interface displayed on an upper layer of the application interface during display of the application interface. For example, when the computer device displays an interface A, an interface B is triggered to be displayed on an upper layer of the interface A in a superimposition manner through an entrance in the interface A, after the interface B is closed, the computer device returns to display the interface A, and the interface A includes the two-dimensional figure display position, the interface B may be referred to as a previous of the interface A.

In some embodiments, the load waiting interface is an interface displayed when jumping from one interface to display another interface and the another interface is not completely loaded. For example, when the computer device displays an interface A, display of an interface B is triggered, a rendering time for a first frame of the interface B is relatively long, and seamless jumping cannot be implemented. In this case, the computer device first displays an intermediate interface, the intermediate interface may display a display progress bar or progress pattern (for example, a rotating circle) of the interface B, and the intermediate interface is the load waiting interface.

That is, in the embodiments of this application, in terms of a loading time, the three-dimensional figure model may be pre-loaded according to an actual usage scene. For example, the three-dimensional figure model is loaded during loading, so that the latest two-dimensional profile image corresponding to the three-dimensional figure can be displayed as soon as possible when the application page is loaded, thereby improving the updating and display timeliness of the two-dimensional profile image.

Step 306: Perform two-dimensional rendering on the three-dimensional figure model to obtain a two-dimensional profile image of the virtual object.

In the embodiments of this application, the computer device may obtain an updated two-dimensional profile image of the virtual object by performing two-dimensional rendering on the three-dimensional figure model.

In some embodiments, the performing two-dimensional rendering on the three-dimensional figure model to obtain a two-dimensional profile image of the virtual object includes:

obtaining a rendering parameter of the three-dimensional figure model based on the two-dimensional figure display position, where the rendering parameter includes at least one of a lens position and a rendering resolution of a virtual camera in the virtual scene; and performing two-dimensional rendering on the three-dimensional figure model based on the rendering parameter to obtain the two-dimensional profile image.

In the embodiments of this application, for different two-dimensional figure display positions, rendering parameters of corresponding two-dimensional figures may also be different. In some embodiments, the same two-dimensional figure display position may include one or more rendering parameters. For example, when the virtual object performs different actions, the rendering parameters of the same two-dimensional figure display position may be different.

For example, an avatar display position on an upper left corner and a two-dimensional figure display position on a lower right corner in a game interface are used as an example. A lens position and a rendering resolution of the avatar display position are a front face position and 720p; when the virtual object runs, a lens position and a rendering resolution corresponding to the two-dimensional figure display position are a side position and 720p; and when the virtual object casts an ability, the lens position and the rendering resolution corresponding to the two-dimensional figure display position are a side angle and 1080p.

In the embodiments of this application, the computer device may store corresponding rendering parameters respectively corresponding to different two-dimensional figure display positions, query a corresponding rendering parameter according to a two-dimensional figure display position when performing two-dimensional rendering on the three-dimensional figure model, and perform two-dimensional rendering on the three-dimensional figure model according to the queried rendering parameter.

In some embodiments, before the loading a three-dimensional figure model of the virtual object, the method further includes:

displaying a rendering parameter setting interface; obtaining a rendering parameter set corresponding to the two-dimensional figure display position in the rendering parameter setting interface; and saving the rendering parameter set corresponding to the two-dimensional figure display position.

In the embodiments of this application, a rendering parameter customization function may be provided. That is, the user may set a lens position and a resolution of a two-dimensional figure displayed on each two-dimensional figure display position through the rendering parameter setting interface. After the user sets the rendering parameter of the two-dimensional figure displayed on each two-dimensional figure display position through the rendering parameter setting interface, the computer device may store the rendering parameter set by the user and each two-dimensional figure display position correspondingly for subsequent query and use.

The attitude parameter setting interface and the rendering parameter setting interface may be the same interface or may be different interfaces.

For example, the attitude parameter setting interface and the rendering parameter setting interface being the same interface is used as an example. As shown in FIG. 4, the parameter setting interface further includes rendering parameter setting controls 43 corresponding to the two-dimensional figure display positions 41. The rendering parameter setting controls 43 include controls used for setting lens positions and controls used for setting resolutions. In the solution shown in FIG. 4, the rendering parameter setting controls 43 are embodied as a drop-down list, and the user may trigger a lens position/resolution list through the drop-down list, to set a lens position/resolution corresponding to a current position.

In the solution shown in the embodiments of this application, when a three-dimensional figure is converted into a two-dimensional profile image, a characteristic of Camera. Render in the unity may be utilized to output content of a specific action of a role photographed by a virtual camera onto rendertexture created by the unity. In this way, rendertexture owns data of a figure of the role, and texture is then converted into a picture type by reading pixels on the texture, to convert a three-dimensional figure into a two-dimensional profile image and save the two-dimensional profile image.

In some embodiments, a manner that a point is bound to a lens is used for processing on a lens position of the virtual camera. That is, a corresponding lens parameter (that is, the lens position) is preset on the three-dimensional figure model, and a corresponding lens is directly invoked during real-time rendering.

Step 307: Display, when a target interface including a two-dimensional figure display position of the virtual object is displayed, the two-dimensional profile image at the two-dimensional figure display position.

In some embodiments, after the computer device generates the latest two-dimensional profile image of the virtual object, the computer device may store the latest two-dimensional profile image locally, and reads the latest two-dimensional profile image locally and displays the latest two-dimensional profile image at a corresponding position when a target interface including a two-dimensional figure display position corresponding to the virtual object is displayed subsequently. This real-time rendering and local storage manner only consumes little traffic of data transmission and does not need to consume a large amount of traffic to download an image.

In another possible implementation, after the computer device generates the latest two-dimensional profile image of the virtual object, the computer device may upload the latest two-dimensional profile image to a network side, for example, to a content delivery network, and pulls the latest two-dimensional profile image from the content delivery network and displays the latest two-dimensional profile image at a corresponding position when a target interface including a two-dimensional figure display position corresponding to the virtual object is displayed subsequently. This network storage manner may reduce the number of generation times of the two-dimensional profile image when the user logs in to the same account alternately through a plurality of computer devices.

According to the solution shown in the embodiments of this application, according to a scene that needs to be displayed, the computer device may control an angle of a lens, a displayed role, and an expression and an action of the role to ensure a display effect in the scene.

In addition, through customized performance before the lens, a generated image may be controlled as an avatar, a half-length image, or a full-length image (for example, controlled through a position of the lens), and images with different degrees of precision are outputted, to meet requirements of different usage scenes in a game.

In addition, this solution may further generate a customized display figure in combination with photography, and can achieve an effect that a player customizes an action, an expression, and a lens angle, and a corresponding image is then rendered in real time according to a figure of the player.

Based on the above, according to the solution shown in the embodiments of this application, when detecting that a two-dimensional profile updating condition is met, a two-dimensional profile image is automatically generated according to a three-dimensional figure model of a virtual object, so that the latest two-dimensional profile image can be displayed in an interface immediately. Therefore, a two-dimensional figure displayed in an interface corresponding to a virtual scene can always match a three-dimensional figure of the virtual object, thereby improving a display effect of a two-dimensional figure of the virtual object.

Figure 5:
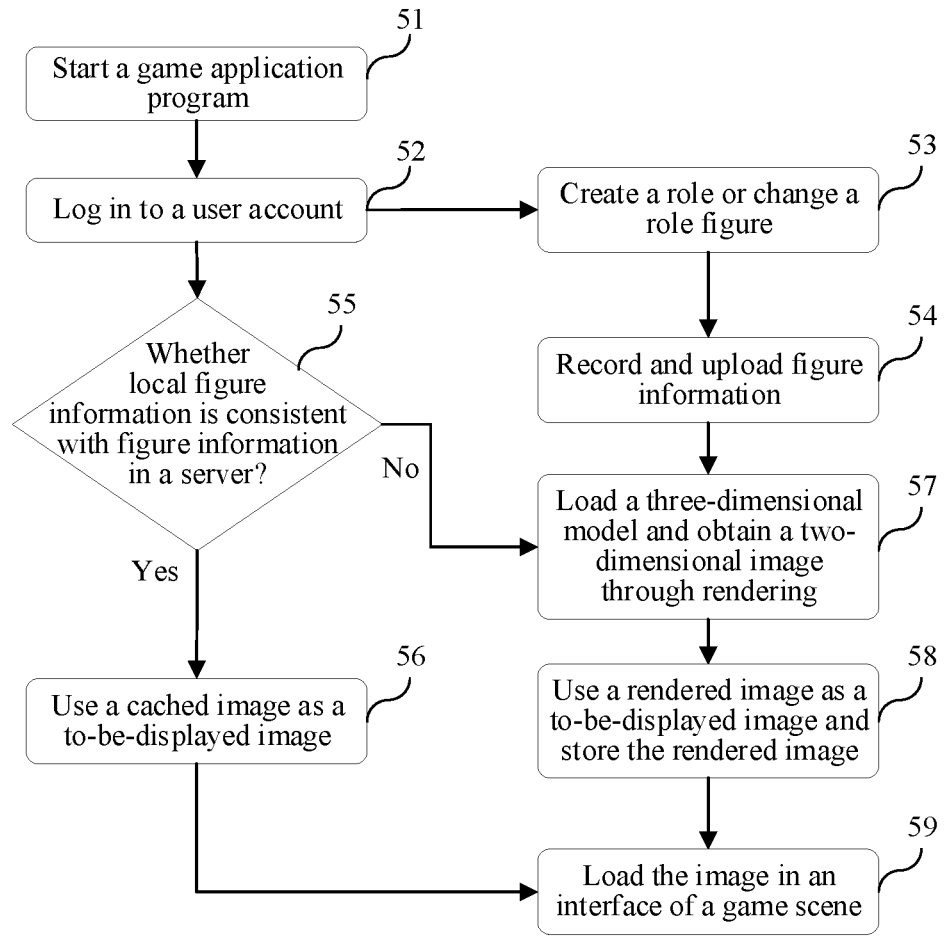
FIG. 5 is a schematic logical diagram of two-dimensional figure displaying according to an exemplary embodiment of this application.

The solution shown in FIG. 2 or FIG. 3 being applicable to a game application program is used as an example, that is, the virtual scene is a game scene, and the virtual object is a player role controlled by the user through a terminal. FIG. 5 is a schematic logical diagram of two-dimensional figure displaying according to an exemplary embodiment of this application. As shown in FIG. 5, a process of the two-dimensional figure displaying may be as follows:

S51: Start a game application program.

S52: A player logs in to a user account.

After the terminal starts the game application program, the user account of the player may be automatically logged in, or the logged player manually inputs the account, or the logged player selects an existing associated account.

S53: The player creates a role or changes a role figure.

When the user account of the player is first logged in to a game, the player may create a player role in a role creating interface, and an initial figure of the player role may be manually customized by the player or randomly set.

In a game process, the player may change the figure of the player role through a figure changing interface, to change body appearance or change a fashion dress/widget. In some embodiments, when the player controls the player role to equip/change an equipment having an appearance effect, the figure of the player role may also be changed.

S54: Record figure information of the player role and upload the figure information to a server, and enter S56.

After the player creates a role or change a role figure, the terminal may record current figure information of the player role and update the recorded figure information to the server.

S55: When the player does not change the role figure, the terminal further compares whether figure information of a two-dimensional profile image in a local cache of the player role is consistent with the current figure information of the player role stored in the server. If yes, S56 is performed; otherwise, S57 is performed.

S56: The terminal uses the two-dimensional profile image in the local cache of the player role as a to-be-displayed two-dimensional profile image.

S57: The terminal loads a three-dimensional figure model of the player role according to the current figure information of the player role, and performs rendering processing to obtain a two-dimensional profile image.

In this solution, if the user changes a login device, whether cache information on a new device is consistent with information recorded on the server may be compared, the cached profile image is till used if consistent, and pre-rendering processing is performed again if inconsistent.

The terminal generates different two-dimensional profile images for different positions according to the solution in the embodiment shown in FIG. 2 or FIG. 3 in combination with the figure information and a position relationship of the player role.

Figure 6:
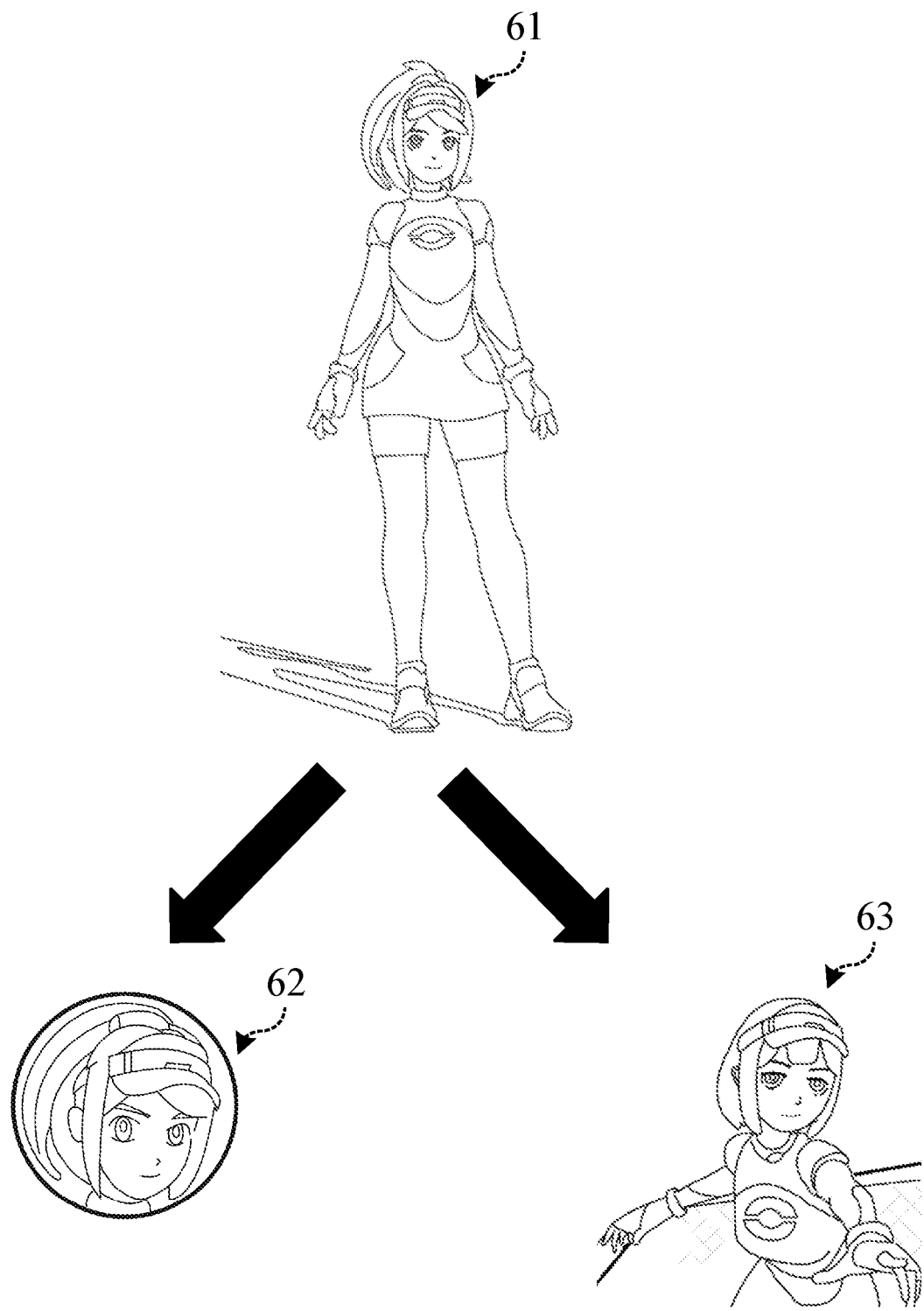
FIG. 6 is a schematic diagram of a two-dimensional image rendered by a three-dimensional model involved in the embodiment shown in FIG. 5.

For example, FIG. 6 is a schematic diagram of a two-dimensional image rendered by a three-dimensional model involved in an embodiment of this application. As shown in FIG. 6, for a three-dimensional figure model 61 of the player role, based on parameters such as a lens position, a resolution, an action, and an expression corresponding to an avatar display position, the terminal acquires a two-dimensional profile image 62 corresponding to an avatar and a two-dimensional profile image 63 corresponding to an upper body. In some embodiment, the two-dimensional image is a profile image for a user controlling the virtual object correspond to the three-dimensional figure model.

S58: The terminal outputs the two-dimensional profile image obtained through rendering as a to-be-displayed two-dimensional profile image, and correspondingly stores the two-dimensional profile image obtained through rendering and the current figure information locally.

S59: Load the to-be-displayed two-dimensional profile image in an interface of a game scene.

Figure 7:
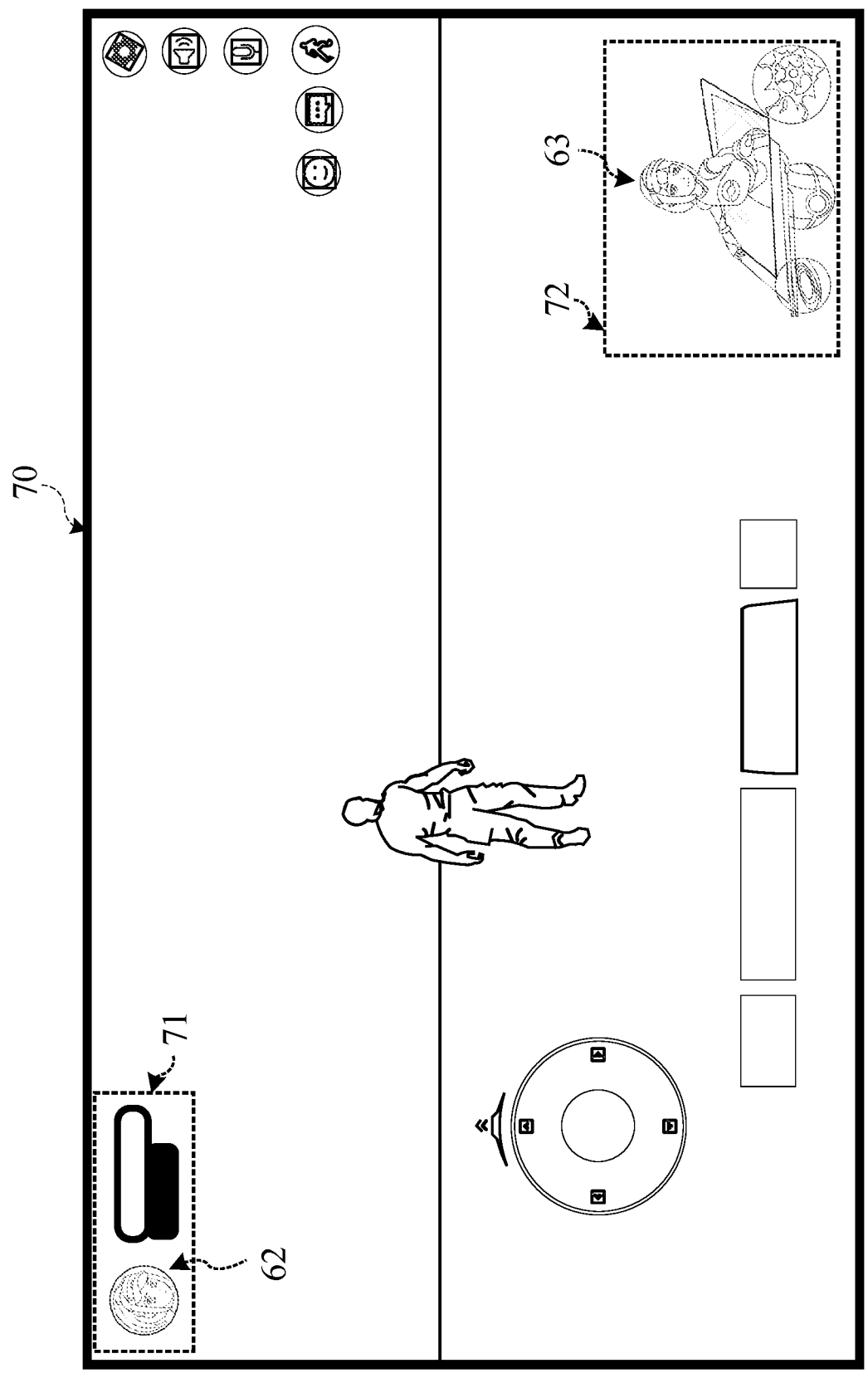
FIG. 7 is a schematic diagram of displaying a two-dimensional profile image involved in the embodiment shown in FIG. 5.

For example, FIG. 7 is a schematic diagram of displaying a two-dimensional profile image involved in an embodiment of this application. As shown in FIG. 7, in a game scene 70, an upper left corner position is an avatar display position 71, and a lower right corner position is a half-length image display position 72. With reference to the two-dimensional profile image shown in FIG. 6, the terminal displays the two-dimensional profile image 62 corresponding to the avatar at the position 71, and displays the two-dimensional profile image 63 corresponding to the upper body at the position 72.

In this solution, when the player creates a role or changes a figure, figure information of a trainer may be uploaded and recorded. After the content is recorded, a role figure may be pre-loaded and corresponding rendering processing may be performed while ensuring that the player information is not changed (for example, when the player clicks a figure changing completion button or exits a figure changing interface). The rendered profile image may be cached locally and invoked in a corresponding usage scene.

That is, the action of the two-dimensional image generated according to this solution may be adjusted according to a usage scene, and dressing may be changed in real time according to figure changes of the trainer, thereby ensuring a better display effect.

Figure 8:
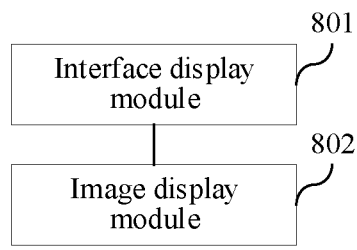
FIG. 8 is a structural block diagram of a two-dimensional figure display apparatus for a virtual object according to an exemplary embodiment of this application.

FIG. 8 is a structural block diagram of a two-dimensional figure display apparatus for a virtual object according to an exemplary embodiment of this application. As shown in FIG. 8, the apparatus includes:

an interface display module 801, configured to display a target interface including a two-dimensional figure display position of the virtual object, where the virtual object has a three-dimensional figure model of an object displayed in the virtual scene;

an image display module 802, configured to display a two-dimensional profile image of the virtual object at the two-dimensional figure display position; and the image display module 802 being further configured to display an updated two-dimensional profile image of the virtual object at the two-dimensional figure display position when a two-dimensional profile updating condition is met, where the updated two-dimensional profile image corresponds to a three-dimensional figure model of the virtual object.

In some embodiments, the image display module 802 includes:

a model loading sub-module, configured to load the three-dimensional figure model of the virtual object when the two-dimensional profile updating condition is met;

a rendering sub-module, configured to perform two-dimensional rendering on the three-dimensional figure model to obtain the updated two-dimensional profile image of the virtual object; and an image display sub-module, configured to display the updated two-dimensional profile image at the two-dimensional figure display position.

In some embodiments, the model loading sub-module is configured to:

obtain an attitude parameter of the three-dimensional figure model based on the two-dimensional figure display position, where the attitude parameter includes at least one of an action and an expression; and load the three-dimensional figure model based on the attitude parameter.

In some embodiments, the apparatus further includes:

a first interface display module, configured to display an attitude parameter setting interface before the model loading sub-module loads the three-dimensional figure model of the virtual object;

an attitude parameter obtaining module, configured to obtain an attitude parameter set corresponding to the two-dimensional figure display position in the attitude parameter setting interface; and an attitude parameter saving module, configured to save the attitude parameter set corresponding to the two-dimensional figure display position.

In some embodiments, the model loading sub-module includes:

a loading parameter obtaining unit, configured to obtain a loading parameter of the three-dimensional figure model, where the loading parameter includes at least one of a resolution and a size; and a loading unit, configured to load the three-dimensional figure model based on the loading parameter.

In some embodiments, the apparatus is applicable to a terminal, and the loading parameter obtaining unit is configured to obtain the loading parameter based on a computing capability parameter of the terminal.

In some embodiments, the target interface is an application interface of an application program corresponding to the virtual object, and the model loading sub-module is configured to pre-load the three-dimensional figure model before the application interface is displayed.

In some embodiments, the model loading sub-module is configured to:

load the three-dimensional figure model when a previous interface of the application interface is displayed; or load the three-dimensional figure model when a load waiting interface is displayed, where the load waiting interface is an interface displayed before the application interface is completely loaded.

In some embodiments, the apparatus further includes:

a first information obtaining module, configured to obtaining figure information of the virtual object from the two-dimensional profile image before updating, where the figure information is used for describing figure features of a three-dimensional model of the virtual object corresponding to the two-dimensional profile image;

a second information obtaining module, configured to obtain current figure information of the virtual object; and a condition determining module, configured to determine that the two-dimensional profile updating condition is met when the figure information of the virtual object from the two-dimensional profile image before updating does not match the current figure information of the virtual object.

In some embodiments, the second information obtaining module is configured to obtain the current figure information of the virtual object from a server, where the current figure information of the virtual object is uploaded to the server when the virtual object is created or a figure change occurs.

In some embodiments, the rendering sub-module is configured to:

obtain a rendering parameter of the three-dimensional figure model based on the two-dimensional figure display position, where the rendering parameter includes at least one of a lens position and a rendering resolution of a virtual camera in the virtual scene; and perform two-dimensional rendering on the three-dimensional figure model based on the rendering parameter to obtain the updated two-dimensional profile image.

In some embodiments, the apparatus further includes:

a second interface display module, configured to display a rendering parameter setting interface before the model loading sub-module loads the three-dimensional figure model of the virtual object;

a rendering parameter obtaining module, configured to obtain a rendering parameter set corresponding to the two-dimensional figure display position in the rendering parameter setting interface; and a rendering parameter saving module, configured to save the rendering parameter set corresponding to the two-dimensional figure display position.

In some embodiments, the apparatus includes:

a condition determining module, configured to determine, before the model loading sub-module loads the three-dimensional figure model of the virtual object, that the two-dimensional profile updating condition is met when an operation for changing a profile image of the virtual object is received.

In some embodiments, the apparatus includes:

a figure changing module, configured to change a figure of the virtual object when an operation for changing a profile image of the virtual object is received.

Based on the above, according to the solution shown in the embodiments of this application, when detecting that a two-dimensional profile updating condition is met, a two-dimensional profile image is automatically generated according to a three-dimensional figure model of a virtual object, so that the latest two-dimensional profile image can be displayed in an interface immediately. Therefore, a two-dimensional figure displayed in an interface corresponding to a virtual scene can always match a three-dimensional figure of the virtual object, thereby improving a display effect of a two-dimensional figure of the virtual object.

Figure 9:
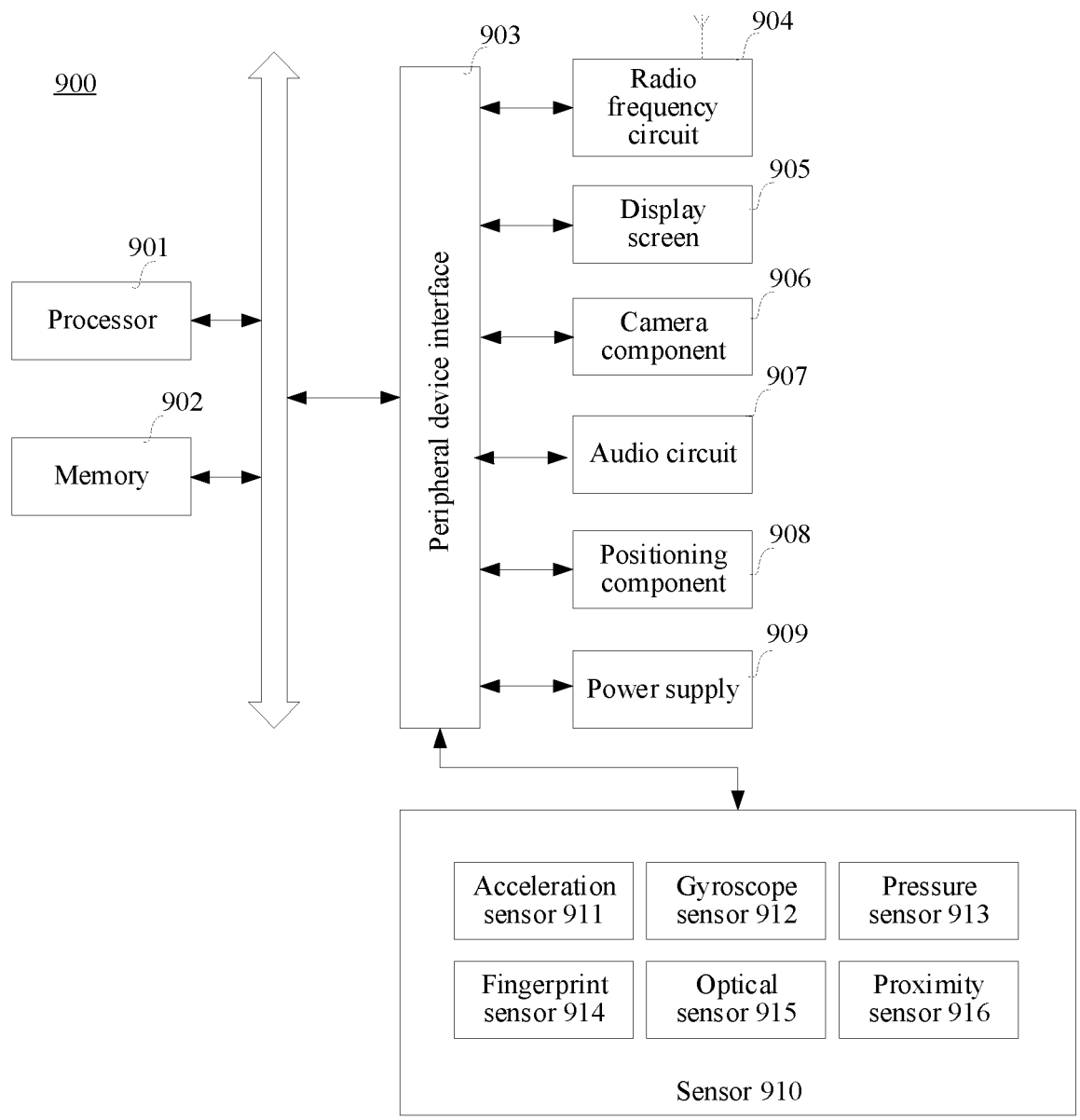
FIG. 9 is a structural block diagram of a computer device according to another exemplary embodiment of this application.

FIG. 9 is a structural block diagram of a computer device 900 according to an exemplary embodiment of this application. The computer device 900 may be a smartphone, a tablet computer, a Moving Picture Experts Group Audio Layer III (MP3) player, a Moving Picture Experts Group Audio Layer IV (MP4) player, a notebook computer, or a desktop computer. The computer device 900 may be further referred to as another name such as user equipment, a portable terminal, a laptop terminal, or a desktop terminal.

Generally, the computer device 900 includes a processor 901 and a memory 902.

The memory 902 may include one or more computer-readable storage media. The computer-readable storage medium may be non-transitory. The memory 902 may further include a high-speed random access memory and a non-volatile memory, for example, one or more disk storage devices or flash storage devices. In some embodiments, a non-transitory computer-readable storage medium in the memory 902 is configured to store at least one computer instruction, the at least one computer instruction being configured to be executed by the processor 901 to implement the method provided in the method embodiments of this application.

In some embodiments, the computer device 900 further includes a peripheral device interface 903 and at least one peripheral device. The processor 901, the memory 902, and the peripheral device interface 903 may be connected through a bus or a signal cable. Each peripheral device may be connected to the peripheral device interface 903 through a bus, a signal cable, or a circuit board. Specifically, the peripheral device includes at least one of a radio frequency (RF) circuit 904, a display screen 905, a camera component 906, an audio circuit 907, a positioning component 908, and a power supply 909.

In some embodiments, the computer device 900 may further include one or more sensors 910. The one or more sensors 910 include, but are not limited to: an acceleration sensor 911, a gyroscope sensor 912, a pressure sensor 913, a fingerprint sensor 914, an optical sensor 915, and a proximity sensor 916.

A person skilled in the art may understand that the structure shown in FIG. 9 does not constitute any limitation to the computer device 900, and the computer device may include more components or fewer components than those shown in the figure, or some components may be combined, or a different component deployment may be used.

A person of ordinary skill in the art may understand that all or some of the steps of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, a code set, or an instruction set, the at least one instruction, the at least one program, the code set, or the instruction set being loaded and executed by a processor to implement the method provided in the foregoing embodiments of this application.

In some embodiments, the computer-readable storage medium may include a read-only memory (ROM), a random access memory (RAM), a solid state drive (SSD), or an optical disc. The RAM may include a resistance random access memory (ReRAM) and a dynamic random access memory (DRAM). The sequence numbers of the foregoing embodiments of this application are merely for description purpose, and are not intended to indicate preference of the embodiments.

A person of ordinary skill in the art may understand that all or some of the steps in the embodiments may be implemented by hardware or a program instructing relevant hardware. The program may be stored in a computer-readable storage medium. The storage medium may be a ROM, a magnetic disk, or an optical disc.

In an exemplary embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the method in the foregoing embodiments.

A person skilled in the art can easily figure out other implementation solutions of this application after considering this specification and practicing the solution that is disclosed herein. This application is intended to cover any variations, uses, or adaptive changes of this application. Such variations, uses, or adaptive changes follow the general principles of this application, and include well-known knowledge and conventional technical means in the art that are not disclosed in this application. This specification and the embodiments are merely considered as examples, and the protection scope of this application is pointed out in the claims.

This application is not limited to the accurate structures/solutions that are described above and that are shown in the accompanying drawings, and modifications and changes may be made without departing from the scope of this application. The scope of this application is subject only to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for displaying a two-dimensional figure of a virtual object performed by a computer device, the method comprising:
    rendering a two-dimensional image of a virtual object based on a corresponding three-dimensional figure model of the virtual object according to a plurality of preset parameters;
    storing the two-dimensional image of the virtual object and corresponding figure information of the virtual object associated with the plurality of preset parameters;
    displaying a target interface comprising the two-dimensional image of the virtual object;
    obtaining current figure information of the virtual object;
    comparing a difference between the current figure information of the virtual object and the corresponding figure information of the virtual object associated with the plurality of preset parameters with an update condition;
    when the update condition is met, updating the two-dimensional image of the virtual object based on the difference between the current figure information of the virtual object and the corresponding figure information of the virtual object associated with the plurality of preset parameters;
    replacing the two-dimensional image of the virtual object with the updated two-dimensional image of the virtual object and the current figure information of the virtual object; and
    displaying the updated two-dimensional image of the virtual object, wherein the updated two-dimensional image corresponds to the three-dimensional figure model of the virtual object.

2. The method according to claim 1, wherein the two-dimensional image is a profile image for a user controlling the virtual object correspond to the three-dimensional figure model.

3. The method according to claim 1, wherein the update condition comprises:
    the stored two-dimensional image does not match the three-dimensional figure model of the virtual object.

4. The method according to claim 1, wherein the update condition comprises:
    an operation for changing a profile image of the virtual object is received.

5. The method according to claim 1, wherein the plurality of preset parameters is obtained by user selection.

6. The method according to claim 1, wherein the plurality of preset parameters comprises a rendering perspective anchored at the three-dimensional figure model.

7. The method according to claim 1, wherein the plurality of preset parameters comprises a pose of the three-dimensional figure model.

8. The method according to claim 1, wherein rendering a two-dimensional image of a virtual object based on a corresponding three-dimensional figure model according to a plurality of preset parameters comprises:
    loading the three-dimensional figure model based on at least a portion of the plurality of preset parameters; and
    rendering the two-dimensional image based on the three-dimensional figure model according to at least a portion of the plurality of preset parameters.

9. The method according to claim 8, wherein the method further comprises:
    loading the three-dimensional figured model with a pose specified by the at least a portion of the plurality of preset parameters; and
    rendering the two-dimensional image from a perspective specified by the at least a portion of the plurality of preset parameters.

10. The method according to claim 8, wherein the loading the three-dimensional figure model based on at least a portion of the plurality of preset parameters comprises:
    loading the three-dimensional figure model with a resolution determined based on a computing capability parameter of the computer device.

11. The method according to claim 8, wherein the loading the three-dimensional figure model happens at a loading stage before the application interface is completely loaded.

12. A computer device, comprising a processor and a memory, the memory storing at least one computer instruction, the at least one computer instruction being loaded and executed by the processor and causing the computer device to implement a method for displaying a two-dimensional figure of a virtual object displayed in a virtual scene, the method comprising:
    rendering a two-dimensional image of a virtual object based on a corresponding three-dimensional figure model of the virtual object according to a plurality of preset parameters;
    storing the two-dimensional image of the virtual object and corresponding figure information of the virtual object associated with the plurality of preset parameters;
    displaying a target interface comprising the two-dimensional image of the virtual object;
    obtaining current figure information of the virtual object;
    comparing a difference between the current figure information of the virtual object and the corresponding figure information of the virtual object associated with the plurality of preset parameters with an update condition;
    when the update condition is met, updating the two-dimensional image of the virtual object based on the difference between the current figure information of the virtual object and the corresponding figure information of the virtual object associated with the plurality of preset parameters;

replacing the two-dimensional image of the virtual object with the updated two-dimensional image of the virtual object and the current figure information of the virtual object; and displaying the updated two-dimensional image of the virtual object, wherein the updated two-dimensional image corresponds to the three-dimensional figure model of the virtual object.

13. The computer device according to claim 12, wherein the update condition comprises:

the stored two-dimensional image does not match the three-dimensional figure model of the virtual object; or an operation for changing a profile image of the virtual object is received.

14. The computer device according to claim 12, wherein the plurality of preset parameters comprise one or more of a rendering perspective anchored at the three-dimensional figure model and a pose of the three-dimensional figure model.

15. The computer device according to claim 12, wherein the rendering a two-dimensional image of a virtual object based on a corresponding three-dimensional figure model according to a plurality of preset parameters comprises:

loading the three-dimensional figure model based on at least a portion of the plurality of preset parameters; and rendering the two-dimensional image based on the three-dimensional figure model according to at least a portion of the plurality of preset parameters.

16. The computer device according to claim 15, wherein the method further comprises:

loading the three-dimensional figured model with a pose specified by the at least a portion of the plurality of preset parameters; and rendering the two-dimensional image from a perspective specified by the at least a portion of the plurality of preset parameters.

17. The computer device according to claim 16, wherein the loading the three-dimensional figure model based on at least a portion of the plurality of preset parameters comprises:

loading the three-dimensional figure model with a resolution determined based on a computing capability parameter of the computer device.

18. A non-transitory computer-readable storage medium, storing at least one computer instruction, the at least one computer instruction being loaded and executed by a processor of a computer device and causing the computer device to a method for displaying a two-dimensional figure of a virtual object displayed in a virtual scene, the method comprising:

rendering a two-dimensional image of a virtual object based on a corresponding three-dimensional figure model of the virtual object according to a plurality of preset parameters;

storing the two-dimensional image of the virtual object and corresponding figure information of the virtual object associated with the plurality of preset parameters;

displaying a target interface comprising the two-dimensional image of the virtual object;

obtaining current figure information of the virtual object;

comparing a difference between the current figure information of the virtual object and the corresponding figure information of the virtual object associated with the plurality of preset parameters with an update condition;

when the update condition is met, updating the two-dimensional image of the virtual object based on the difference between the current figure information of the virtual object and the corresponding figure information of the virtual object associated with the plurality of preset parameters;

replacing the two-dimensional image of the virtual object with the updated two-dimensional image of the virtual object and the current figure information of the virtual object; and displaying the updated two-dimensional image of the virtual object, wherein the updated two-dimensional image corresponds to the three-dimensional figure model of the virtual object.

19. The non-transitory computer-readable storage medium according to claim 18, wherein the update condition comprises:

the stored two-dimensional image does not match the three-dimensional figure model of the virtual object; or an operation for changing a profile image of the virtual object is received.

20. The non-transitory computer-readable storage medium according to claim 18, wherein the plurality of preset parameters comprise one or more of a rendering perspective anchored at the three-dimensional figure model and a pose of the three-dimensional figure model.

* * * * *